United States Patent [19]

Campbell, Jr.

[11] 4,369,332

[45] Jan. 18, 1983

[54] KEY VARIABLE GENERATOR FOR AN ENCRYPTION/DECRYPTION DEVICE

[75] Inventor: Carl M. Campbell, Jr., Newtown Square, Pa.

[73] Assignee: Burroughs Corporation, Detroit, Mich.

[21] Appl. No.: 78,913

[22] Filed: Sep. 26, 1979

[51] Int. Cl.³ .............................................. H04K 1/00
[52] U.S. Cl. ............................... 178/22.07; 178/22.18
[58] Field of Search ................... 178/22, 22.07, 22.18; 340/149 R

[56] References Cited

U.S. PATENT DOCUMENTS 3,958,081  5/1976  Ehrsam et al. ....................... 178/22
4,160,120  7/1979  Barnes et al. ........................ 178/22
4,193,131  3/1980  Lennon et al. .................. 340/149 R Primary Examiner—Sal Cangialosi
Attorney, Agent, or Firm—Mark T. Starr; Kevin R. Peterson; Edmund M. Chung

[57] ABSTRACT

An apparatus and method for generating a unique working key variable for controlling the operation of an encryption/decryption device during each user specified time period. The apparatus generates each working key variable by encrypting a user specified value, unique for each specified time period, under control of a fixed key variable stored in the apparatus. After the user specified value has been encrypted, the apparatus utilizes the encrypted (working) key variable to control the encryption/decryption of data during the corresponding user specified time period.

29 Claims, 7 Drawing Figures

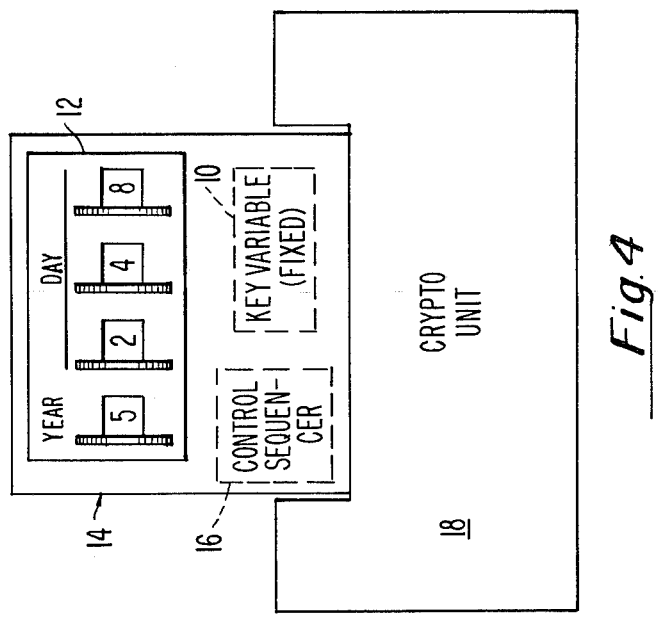
Fig. 4
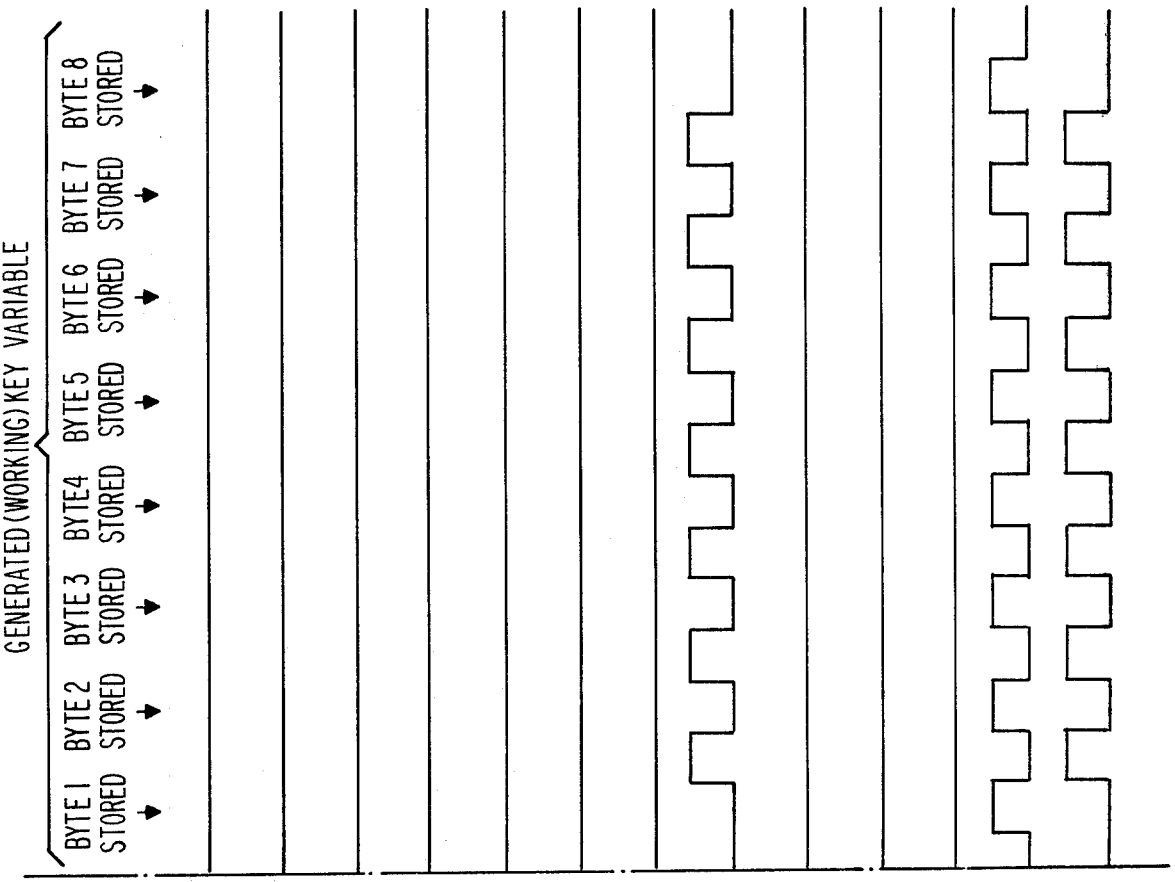
Fig. 5B
Fig. 5
| FIG.5A | FIG.5B |

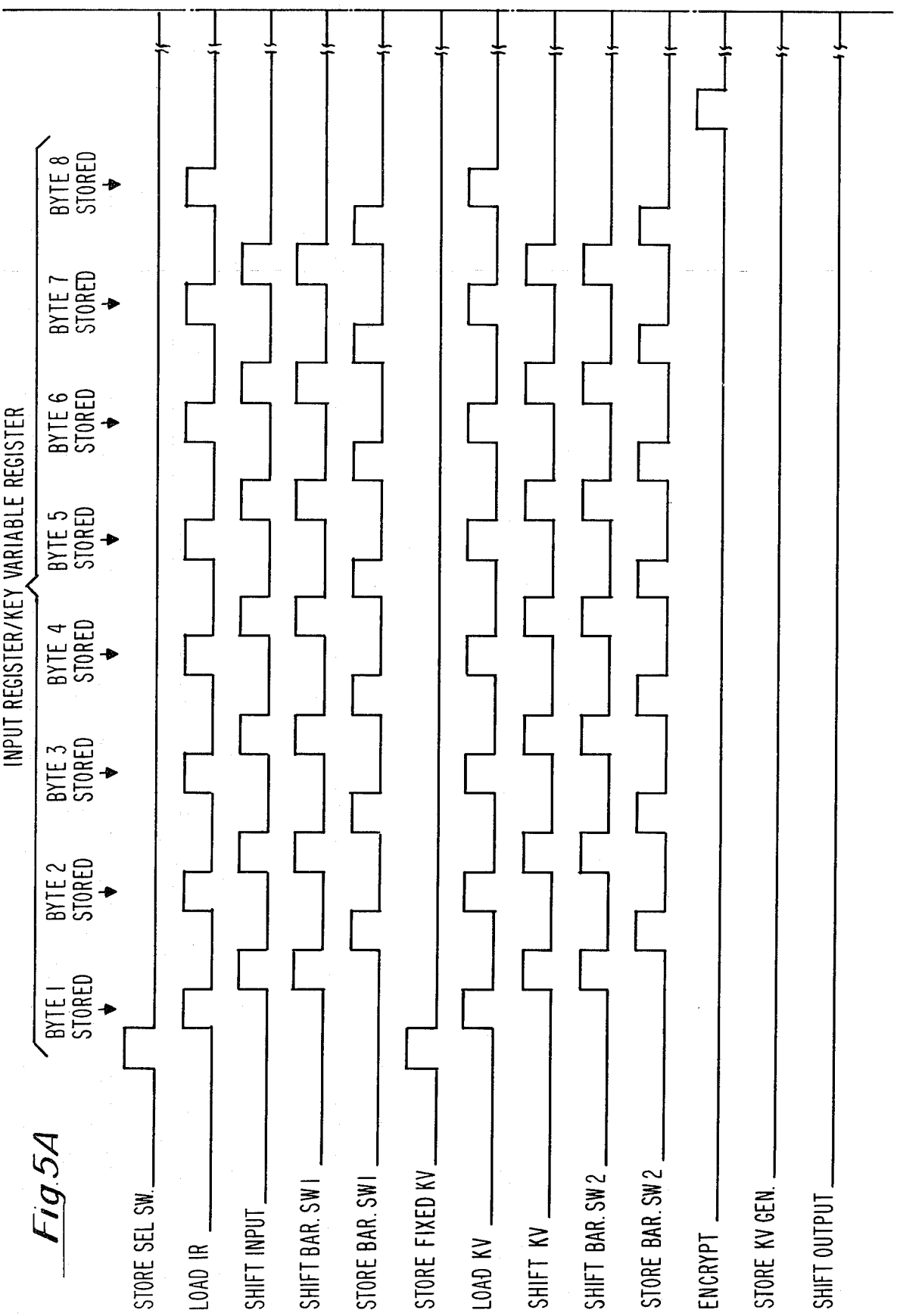

KEY VARIABLE GENERATOR FOR AN ENCRYPTION/DECRYPTION DEVICE

CROSS-REFERENCE TO RELATED APPLICATIONS

Reference is hereby made to a U.S. patent application entitled BYTE STREAM SELECTIVE ENCRYPTION/DECRYPTION DEVICE by Vera L. Barnes et al., Ser. No. 852,444, filed Nov. 17, 1977 and assigned to the same assignee as the present application, now issued as U.S. Pat. No. 4,172,213.

BACKGROUND OF THE INVENTION

The present application relates in general to the art of cryptography and more specifically to hardware and techniques for achieving data communications security.

As the electronic transfer of information becomes more and more common, the need to safeguard this information becomes increasingly important. Many large corporations have data-communications systems over which they transmit, or would like to transmit, information of a sensitive nature, whose disclosure could be very detrimental to the corporation. In addition, the Federal Government is becoming increasingly concerned about insuring the individual's right of privacy. For this reason, the Government is already planning security provisions for its own widespread non-military communications networks. Government regulations of the future may impose similar security requirements upon the many types of non-governmental communications.

Perhaps most important of all is the evolution towards the "cashless society" in which transmitted data represents money. Even today many savings banks send monetary transactions through electronic data communications networks and are thus vulnerable to "electronic counterfeiting". Although it has apparently not yet occurred, a highly sophisticated "counterfeiter", with the ability to both monitor and insert data into the communications link, could manipulate such transactions to his advantage.

From the preceding discussion it is apparent that there are two aspects to communications security: confidentiality assurance and integrity assurance. Confidentiality assurance protects the transmitted data against comprehension by anyone who should tap the communications line. In other words, it provides "read" protection. Integrity assurance, on the other hand, protects the transmitted data against being intercepted, modified, and then retransmitted in such a way that the final recipient of the message will receive an intelligible and apparently valid message but one which has in fact been modified. In other words, this aspect of security provides "write" protection.

Properly designed cryptographic equipment can provide for both of these aspects of security. Encryption by its very nature transforms data into an unintelligible form; hence, all well-designed cryptographic equipment provides confidentiality assurance. Although many encryption techniques do not assure integrity, there are cryptographic techniques known which assure both confidentiality and integrity. Typical of such techniques are those disclosed in U.S. Pat. No. 4,159,468, entitled Communications Line Authentication Device and U.S. Pat. No. 4,160,120, entitled Link Encryption Device, both of which are assigned to the same assignee as the present application and both of which are incorporated in the present application. Such encryption techniques have the characteristic that any change to any character of the cipher (encrypted traffic) causes subsequent characters of the plain-text (decrypted message) to become garbled (rendered unintelligible). This characteristic is called "garble extension". Therefore, it is possible to develop cryptographic equipment which provides for both of these aspects of security by basing this equipment on an encryption technique which is highly secure and which has the "garble extension" property.

An encryption algorithm is an algorithm for transforming a group of plain-text bits "A" into a group of cipher bits "B" under the control of a group of key variable bits, "C". There must also be an inverse or decryption algorithm for transforming the cipher bits "B" back into the plain-text bits "A" under control of these same key variable bits "C". In general "A" and "B" are equal in length and may be very long whereas "C" is relatively short, perhaps 64 bits. An encryption algorithm is secure if there is no way, given the cipher bits, "B", to determine the corresponding plain-text bits, "A", without knowing the key variable bits, "C". Therefore the key variable, "C", must be of sufficient length that no one can determine the key variable on a trial-and-error basis. To insure fraud prevention, an encryption algorithm must have a further characteristic. There must be no way to modify the cipher, "C", to produce a predictable change in the decrypted plain-text, "A", even though one knows this initial plain-text, unless the person attempting this modification also knows the key variable, "C".

The design of a truly secure encryption algorithm is a highly specialized and very difficult task. Outside of the Federal Government itself there are very few people who are truly qualified in this area. Therefore, when the Federal Government decided that encryption was necessary in its commercial type operations, it faced a problem. For these operations the Government has relied almost totally upon commercially available data processing equipment and technology. Were the Government similarly to rely upon commercially-developed encryption equipment, it would find much such equipment being developed by those who were not qualified to do so. It would then be faced with a costly evaluation procedure to determine which equipment provided adequate security and which did not. Furthermore, equipment which provided inadequate security would no doubt be applied to commercial communications outside the Government. Such equipment would not meet security requirements which the Government might impose in the future. Therefore, in order to avoid the difficulties which would be encountered if private industry were to develop encryption algorithms, the Government decided to promulgate a single encryption algorithm as a standard to be used by all manufacturers. This algorithm, known as the National Bureau of Standards (NBS) Data Encryption Standard, was released by the NBS in the Federal Information Processing Standards Publication (FIPS Pub) 46-Jan. 15, 1977, and is intended for use as an industry standard.

The Data Encryption Standard (DES) was designed for 64-bit block data operation. The key variable is 56 bits in length and is loaded into the algorithm before the encryption/decryption process is initiated. In the encrypt mode the algorithm produces 64 bits of cipher text for each 64 bits of input plain text. Conversely, in the decrypt mode, if the 64 bits of cipher text are provided as the input, the algorithm will produce the original 64 bits of input plain text. The Data Encryption Standard is incorporated by reference in this specification.

From the foregoing discussion, it is apparent that since the Data Encryption Standard is known to those skilled in the art, the security of data encrypted using the DES is heavily dependent on safeguarding the key variable which controls the encryption of data.

Therefore, it is a general object of the present invention to provide an apparatus and method for safeguarding the key variable used to control enciphering and deciphering of data using the DES.

It is a further object of the present invention to provide an apparatus and method for modifying the key variable used in the DES without the operator having knowledge of the key variable.

It is another object of the present invention to provide an apparatus and method which allows all cryptographic devices connected to the same system to be loaded with identical key variables which may be changed as often as deemed necessary.

It is still another object of the present invention to provide an apparatus and method by which a unique key variable can be provided for each period of time without the need for an elaborate key variable distribution system.

These and other objects, features and advantages of the present invention will become apparent from the description of the preferred embodiment of the invention when read in conjunction with the drawings contained herewith.

SUMMARY OF THE INVENTION

The foregoing objects of the present invention are achieved by providing a key variable generating apparatus by which a unique key variable can be provided to a plurality of encryption/decryption (cryptographic) devices for each crypto period without the need for an elaborate key variable distribution system.

Each key variable generating apparatus includes a long-term key variable stored in a non-volatile read-only memory and a set of selector switches which can be changed as needed. The selector switches are set to a value which is unique for each crypto period. The apparatus loads the selector switch settings into the input register of the cryptographic device and simultaneously loads the key variable from the read-only memory of the generating apparatus into the key variable register of the cryptographic device. The cryptographic device then operates in normal manner for encryption and produces in its output register the result of encrypting the externally-provided selector switch settings using as a key variable the externally provided value. The contents of the output register are then shifted into the key variable register, serving as the working key variable for the crypto period and replacing the value which had previously been loaded from the external read-only memory.

All interconnected cryptographic devices must utilize generating apparatuses whose selector switches are set to identical values and whose read-only memories contain identical bit patterns. This assures that the same working key variable is produced for each interconnected cryptographic device. The generating apparatus need be inserted into the cryptographic device only momentarily. The rest of the time, including the time during which the cryptographic device is actually operating, the generating device should be safeguarded to assure that the long term key variable which it contains is not compromised.

In the preferred embodiment of the present invention, the cryptographic device utilizes circuitry which implements the block encryption technique specified in the NBS Data Encryption Standard. That is, one provides to the cryptographic device a block of 64 plain-text bits along with a key variable of 64 bits. When the cryptographic device is signaled to encrypt, the output which the cryptographic device produces consists of 64 cipher bits bearing no resemblance to the 64 plain-text input bits.

BRIEF DESCRIPTION OF THE DRAWINGS

FIG. 4 illustrates the physical appearance of the loading device for generating a daily unique working key variable.

FIG. 5, a composite of FIGS. 5A and 5B, is a timing diagram showing the control signals utilized to control the preferred embodiment of the present invention.

DESCRIPTION OF THE PREFERRED EMBODIMENT

Figure 1:
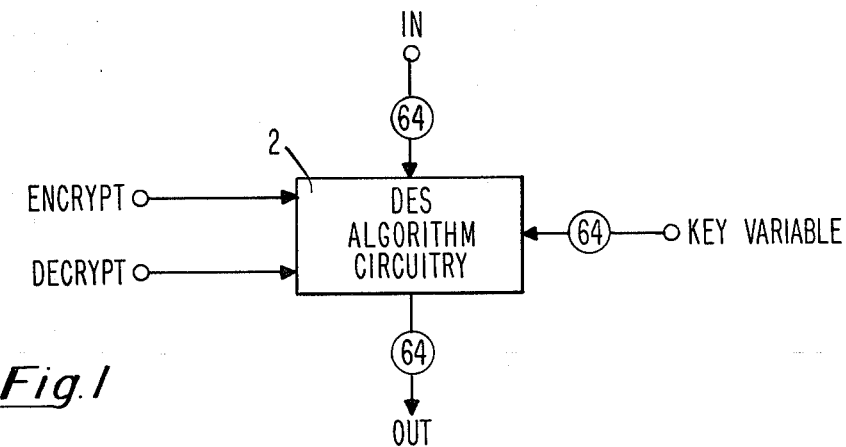
FIG. 1 illustrates the general characteristics of the N.B.S. Block-Encryption Algorithm.

The general characteristics of the NBS encryption algorithm are indicated in FIG. 1. Note that it is a "block encryption" technique. That is, one provides to the algorithm 2 a block of 64 plain-text bits along with a key variable of 64 bits. One then tells the algorithm 2 to "encrypt". The output which the algorithm 2 produces consists of 64 cipher bits bearing no resemblance to the 64 input plain-text bits.

The algorithm 2 can be operated in the inverse manner also. In the case, one provides to the algorithm 2 64 cipher bits as well as the same key variable which was used to generate these cipher bits. The algorithm 2 is then told to "decrypt" and produces as its output the original 64 plain-text bits.

The algorithm 2 has several characteristics which should be noted. First, for any given key variable, two input blocks which are identical produce identical cipher blocks. Second, two input blocks which differ by only one bit produce cipher blocks which bear no resemblance to each other, even though the same key variable is used for both. Third, the algorithm 2 must be given a full 64 bits. If less than 64 bits are to be encrypted, the balance must be padded with zeros or any other predetermined value. For example, to encrypt 10 bits one must pad the remaining 54 bits with zeros or any other predetermined value. The resulting cipher will have a random appearance and all 64 bits of this cipher must be transmitted so that the decryption process can reconstruct the original 10 information bits.

Figure 2:
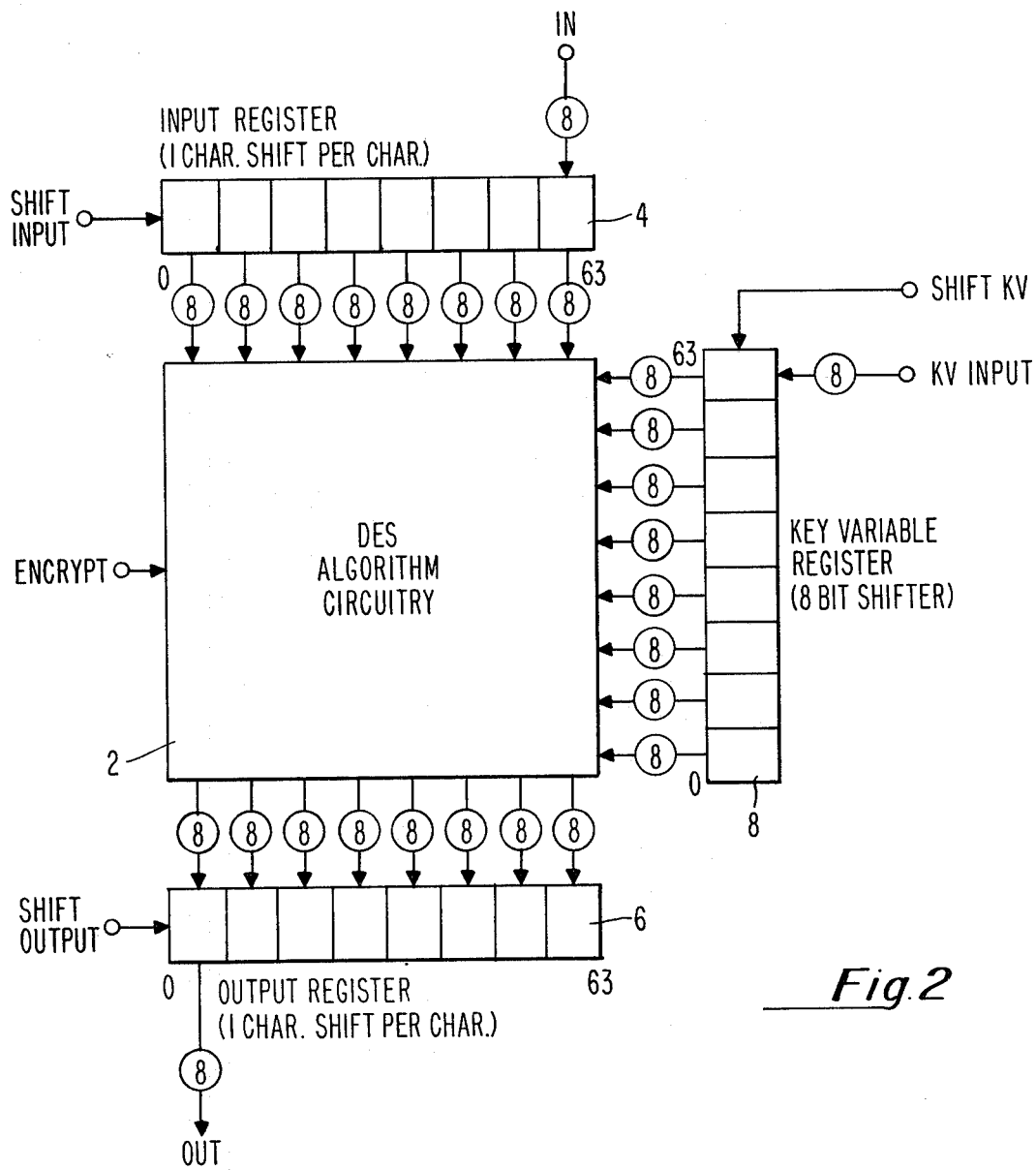
FIG. 2 illustrates the preferred embodiment of the N.B.S. Block Encryption Algorithm circuitry used in the present invention.

Referring now to FIG. 2, in the preferred embodiment of the present invention, the NBS algorithm circuitry 2 is implemented in a single LSI chip. To avoid the necessity of an excessively large number of pins on this chip, the input and output registers 4,6, shown above and below the algorithm circuitry 2 are included on the chip. Thus the input to the chip is an 8-bit series-parallel input rather than the parallel 64 bit input which the algorithm circuitry 2 itself requires. Similarly, the output from the chip is an 8-bit series-parallel output rather than the 64 bit parallel output which the algorithm circuitry 2 inherently provides. As shown in FIG. 2, the 64 bit key variable is similarly loaded into the chip eight bits at a time.

In the preferred embodiment of the present invention, the one-chip implementation of the data encryption algorithm circuitry 2 includes a key variable register 8 within the chip itself. The 64 key-variable bits are loaded 8 bits at a time in series-parallel. Since storage within the chip is volatile, the key variable must be reloaded each time the power to the chip has been interrupted. Presumably, therefore the key variable must be loaded into the chip at least once per day in most applications.

The NBS encryption algorithm is an extremely strong cryptographic algorithm and a very long time, perhaps thousands of years, would be required to determine even a single key variable by analytical techniques. For this reason, the frequency with which the key variable must be changed, that is, replaced by a different bit pattern, depends almost totally upon physical security considerations. Therefore, if one had complete assurance that the key variable had not been compromised, one could have a "crypto period" (viz., the length of time that a single key variable is used) with a duration up to several years. In those applications in which one is primarily concerned with fraud prevention rather than with confidentiality assurance (for example, certain banking applications), the "crypto period" can have a very long duration because any compromise of the key variable which resulted in fraud would come to light within a few days after the fraud had been committed. In other applications where one is concerned with protecting the confidentiality of transmitted data, the key variable should be changed more frequently since there is no way of knowing when the key variable might have been compromised.

Figure 3:
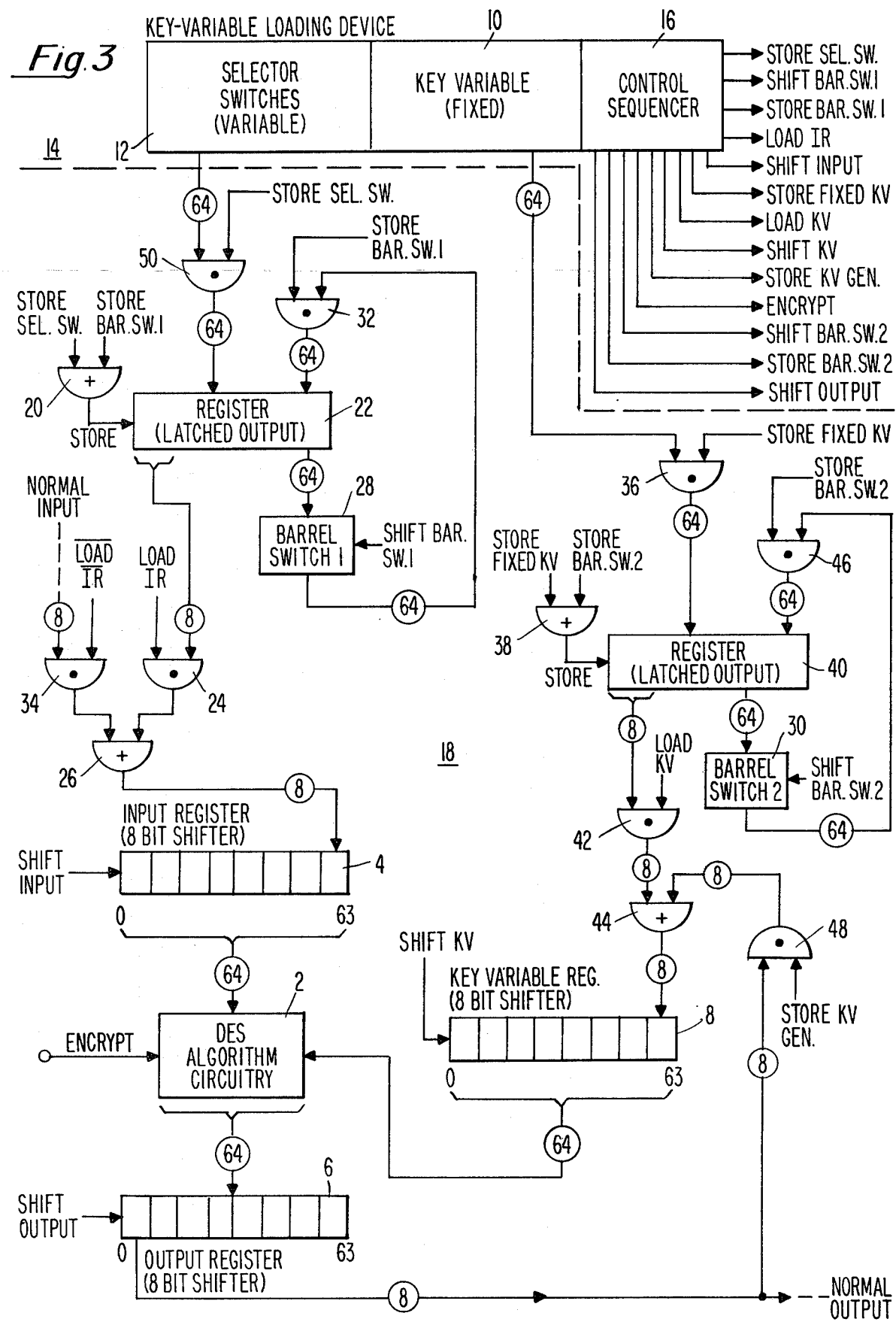
FIG. 3 shows the preferred embodiment of the present invention as utilized to generate a unique key variable for each crypto period.

As shown in FIG. 3, the preferred embodiment of the present invention provides an apparatus for loading and changing the key variable. More particularly, the present invention provides an apparatus by which a unique key variable can be provided for each "crypto period" without the need for an elaborate key variable distribution system.

As shown in FIG. 3, the preferred embodiment of the present invention includes a key variable loading device 14. The loading device 14 includes a fixed long-term key variable stored in a non-volatile read-only memory 10 and a set of selector switches 12 (numbering four in the preferred embodiment), the set of selector switches 12 being changeable as will be discussed below. In addition, the key-variable loading device 14 includes a control sequencer 16 to control the generation and storage of the unique key variable provided for each crypto period.

The design of the required control sequencer 16 will be obvious to those skilled in the art from the discussion to follow. The control sequencer 16 controls the sequencing of the various elements included in the preferred embodiment of the invention. Among the possibilities for implementing the control sequencer is the use of a microprocessor.

The physical appearance of the key variable loading device 14 is generally indicated in FIG. 4. The selector switches 12 are set to a value which is unique for each crypto period. Thus, if the crypto period is one day, the day's date would be a convenient value to use for the selector switch 12 settings. The selector switch 12 settings must be unique for each crypto period, but need not be either random or secret. In the preferred embodiment, the selector switches 12 provide 64 bits of output which may consist of eight output bit positions from each of the four selector switches and 32 bits of zeros to pad the output to 64 bit positions. Variations on the preferred embodiment of the selector switches 12 will be obvious to those skilled in the art. Thus, for example, each of the eight bit position outputs of each of the four selector switches may be fed to two bytes of the 8-byte output of the selector switches 12.

As is generally shown in FIG. 3, when the key loading device 14 is inserted in the crypto device 18, the selector switch 12 settings are loaded into the input register 4 of the cryptographic device 18 itself. Similarly, the fixed key variable from the read-only memory 10 of the loading device 14 is loaded into the key variable register 8 of the cryptographic device 18. The algorithm circuitry 2 is then operated in the normal manner for encryption and produces in the output register 6 a 64 bit result; viz., the result of encrypting the externally-provided selector switch 12 settings using as a key variable the externally provided value. The 64 bits of the output register 6 are then shifted into the key variable register 8, serving as the working key variable for the crypto period and replacing the value which had previously been loaded from the external PROM 10.

The two cryptographic devices at either end of a communications link must have loading devices 14 (FIG. 4) whose selector switches 12 are set to identical values and whose read-only memories 10 contain identical bit patterns. This guarantees that the precise same working key variable are produced by both.

The loading device 14 of FIG. 4 need be inserted into the cryptographic device 18 only momentarily. The rest of the time, including the time during which the cryptographic device 18 is actually operating, the loading device 14 should be kept in a locked safe. The loading device 14 must be protected with very secure physical security measures because if the long-term key variable which it contains is ever compromised, the security of the cryptographic device 18 itself is compromised.

A more detailed description of the operation of the present invention will now be presented. It will be assumed that the operator has set a value into the selector switches corresponding to the day's date and will now insert the key variable loading device 14 into the crypto device 18.

Referring now to FIGS. 3 and the timing diagram of FIG. 5, it should first be noted that the control sequencer 16 provides the present invention with the signal sequences specified in FIG. 5. After the loading device 14 is inserted into the crypto unit 18, the 64-bit output of the selector switches 12 is gated through AND circuit 50 and stored in register 22 in response to the STORE SEL. SW. signal provided by control sequencer 16. Next, in response to the LOAD I.R. control signal, the high order (leftmost) byte of register 22 is gated through AND circuit 24 and OR circuit 26 and stored in the low order (rightmost) byte of input register 4. At this time, the low order byte of input register 4 contains the equivalent of the high order byte of the 64-bit selector switch 12 output.

The barrel switches 28,30 shown in FIG. 3 provide a means for shifting data words by any selected amount to the right or left either end-off or end-around. In the preferred embodiment, the barrel switches 28,30 are utilized to shift the 64-bit data word inputs eight bit positions to the left end-off (or alternatively end-around). The design of such a barrel switch is known in the prior art and may, for example, utilize the barrel switch taught in U.S. Pat. No. 3,610,903 entitled Electronic Barrel Switch for Data Shifting, by Richard A. Stokes et al., issued Oct. 5, 1971 and assigned to the same assignee as the present invention. Alternate embodiments to implement this eight bit right end-off shift will no doubt be apparent to those skilled in the art.

At this time, the control sequencer 16 next activates both the SHIFT INPUT and SHIFT BAR. SW1 signals. In response to the SHIFT INPUT signal, the contents of input register 4 are shifted 8-bit positions to the left end-off, thus moving the contents of bit positions 7–63 of input register 4 to bit positions 0–55, thus putting the equivalent of the high order byte of the selector switch 12 64-bit output in bit positions 47–55 of input register 4. In response to the SHIFT BAR SW1 signal, the 64-bit input to barrel switch 1 is shifted 8-bit positions left, with the resulting left shifted data being available at the output of barrel switch 28.

Next, the control sequencer 16 activates the STORE BAR SW1 signal, thus gating the output of barrel switch 28 through AND circuit 32 and storing it in register 22. At this time, the high order 56-bit positions of register 22 contain data equivalent to that in the low-order 56 output bit positions of selector switch 12.

As will be obvious to those skilled in the art from the timing diagram of FIG. 5, the latter discussed sequence is repeated until the equivalent of what was the initial contents of register 22 is stored in input register 4. Thus, since the contents initially stored in register 22 was the equivalent of the 64-bit output of the selector switches 12, at this time the equivalent of the selector switch 12 output has been transferred series-parallel 8-bits at a time to input register 4.

Simultaneous with the loading of the selector switch 12 output into register 22, the output of the read-only memory 10 is gated through AND circuit 36 and stored in register 40 in response to the STORE FIXED KV signal provided by control sequencer 16. At this time, the equivalent of the fixed key variable that was stored in memory 10 has been stored in register 40. Next, in response to the LOAD KV control signal, the high order (leftmost) byte of register 40 is gated through AND circuit 42 and OR circuit 44, and stored in the low order (rightmost) byte of key variable register 8. At this time, the low order byte of key variable register 8 contains the equivalent of the high order byte of the fixed key variable memory 10.

Next, the control sequencer 16 activates both the SHIFT KV and SHIFT BAR SW2 signals. In response to the SHIFT KV signal, the contents of key variable register 8 are shifted 8-bit positions to the left end-off, thus moving the contents of bit positions 7–63 of key variable register 8 to bit positions 0–55, thus putting the equivalent of the high order byte of the fixed key variable memory 10 in bit positions 47–55 of key variable register 8. In response to the SHIFT BAR SW2 signal, the 64 bit input to barrel switch 30 is shifted 8-bit positions left, with the resulting left shifted data being available at the output of barrel switch 30.

Next, the control sequencer 16 activates the STORE BAR SW2 signal, thus gating the output of barrel switch 30 through AND circuit 46 and storing it in register 40. At this time, the high order 56-bit positions of register 40 contain data equivalent to that in the low-order 56 bit positions of fixed key variable memory 10.

The latter discussed sequence is repeated (FIG. 5) until the equivalent of what was the initial contents of register 40 is stored in key variable register 8. Thus, since the contents initially stored in register 40 was the equivalent of the 64-bit fixed key variable stored in memory 10, at this time the equivalent of the fixed key variable has been transferred series-parallel 8-bits at a time to key variable register 8.

At this point, the selector switch 12 settings have been loaded into the input register 4 and the fixed key variable has been loaded into the key variable register 8. Next, the control sequencer 16 activates the ENCRYPT control signal which starts the DES algorithm circuitry 2 and the contents of the input register 4 are encrypted in the normal manner, the encryption circuitry 2 utilizing as a key variable the contents of the key variable register 8. The control sequencer 16 then waits the required time period for the DES algorithm circuitry 2 to complete encrypting the input data received from the input register 4. The algorithm circuitry 2 produces and transfers to the output register 6 a 64-bit result; viz., the result of encrypting the externally-provided selector switch settings using as a key variable the externally provided fixed key variable.

After the output of the algorithm circuitry 2 is available in the output register 6, the control sequencer 16 activates the STORE KEY GEN control signal which gates the high-order (leftmost) byte of the output register 6 first through AND circuit 48, then through OR circuit 44 and into the low-order (rightmost) byte position of key variable register 8. Next the control sequencer 16 activates the SHIFT KV and SHIFT OUTPUT signals. The SHIFT KV signal causes the contents of key variable register 8 to be shifted left 8-bit positions to key variable register 8 bit positions 48–55. The SHIFT OUTPUT CONTROL signal causes the contents of output register 6 to be shifted left 8-bit positions, thus moving the contents of bit positions 8–63 into bit positions 0–55, respectively. As shown in the timing diagram of FIG. 5, the latter discussed sequence is repeated six additional times and finally the control sequencer 16 activates the STORE KV GEN signal one final time. At this point, the output of the DES algorithm circuity, as stored in output register 6 after the encryption operation, has been transferred byte series parallel to key variable register 8.

At this time, the present invention has completed the generation of a working key variable which is unique for the crypto period specified in the selector switch 12 settings and has stored the generated key variable in the key variable register 8 where it will be utilized to control the encryption of data during the specified crypto period. After the present invention has completed the generation of the working key variable, the operator removes the key-variable loading device 14 from the crypto device 18 since the key-variable loading device 14 should be safeguarded until it is desired to generate a key variable for a new crypto period.

having shown and described the preferred embodiment of the present invention, those skilled in the art will realize that various omissions, substitutions and changes to the preferred embodiment may be made without departing from the spirit of the invention. It is the intention, therefore, only to be limited by the scope of the following claims.

What is claimed is:

1. An apparatus for generating a working key variable for use in a cryptographic device, said cryptographic device including an input for incoming data, an input for a key variable and an output for translated data, said apparatus comprising:

plug-in means, engageable with said cryptographic device by an operator, said plug-in means for initiating and controlling the generation of one of said working key variables, said plug-in means including switchable means, settable by said operator, said switchable means for entering an operator specified variable, memory means for storing a fixed key variable, and control means for causing the transfer of said operator specified variable to the incoming data input of said cryptographic device and the transfer of said fixed key variable to the key variable input of said cryptographic device, said control means additionally for activating said cryptographic device, wherein said operator specified variable is encrypted in accordance with said fixed key variable, whereby said working key variable is produced at the translated data output of said cryptographic device; and means, connected to the translated data output of said cryptographic device and the key variable input of said cryptographic device, said latter means for supplying said generated working key variable as the key variable input to said cryptographic device.

2. The apparatus in accordance with claim 1 further including:

first input register means, connected to the incoming data input of said cryptographic device, said first input register means for inputting the incoming data to said cryptographic device; and first transfer means, connected between said switchable means and said first input register means and responsive to said control means, said first transfer means for transferring the contents of said switchable means into said first input register means.

3. The apparatus in accordance with claim 2 wherein said first transfer means includes:

first register means, connected to said switchable means, said first register means for storing the contents of said switchable means; and first byte transfer means, connected between one byte position of the output of said first register means and one input byte position of said first input register means, said first byte transfer means for transferring the connected output of said first register means to the connected input of said first input register means.

4. The apparatus in accordance with claim 3 wherein said first byte transfer means includes means, connected to said first register means for rotating the contents of said first register means at least one bit position.

5. The apparatus in accordance with claim 4 wherein: said first byte transfer means is connected between the high order byte position of the output of said first register means and the low order input byte position of said first input register means; and said first register rotating means includes means for rotating the contents of said first register means one byte position left.

6. The apparatus in accordance with claim 4 wherein said first input register means further includes means for shifting the contents of said first input register means one byte position left.

7. The apparatus in accordance with claim 2 wherein said switchable means includes at least one variable selector switch for entering the operator specified variable.

8. The apparatus in accordance with claim 1 or 2 further including:

second input register means, connected to the key variable input of said cryptographic device, said second input register means for inputting the key variable to said cryptographic device; and second transfer means, connected between said memory means and said second input register means and responsive to said control means, said second transfer means for transferring the contents of said memory means to said second input register means.

9. The apparatus in accordance with claim 8 wherein said memory means includes a read only memory.

10. The apparatus in accordance with claim 8 wherein said second transfer means includes:

second register means, connected to said memory means, said second register means for storing the contents of said memory means; and second byte transfer means, connected between one byte position of the output of said second register means and one input byte position of said second input register means, said second byte transfer means for transferring the connected output of said second register means to the connected input of said second input register means.

11. The apparatus in accordance with claim 10 wherein said second byte transfer means includes means, connected to said second register means, for rotating the contents of said second register means at least one bit position.

12. The apparatus in accordance with claim 11 wherein:

said second byte transfer means is connected between the high order byte position of the output of said second register means and the low order byte position of said second input register means; and said second register rotating means includes means for rotating the contents of said second register means one byte position left.

13. The apparatus in accordance with claim 11 wherein said second input register means includes means for shifting the contents of said second input register one byte position left.

14. The apparatus in accordance with claim 8 wherein said generated working key variable supply means includes:

output register means for storing the translated data output of said cryptographic device; and third transfer means, connected between the output of said output register means and the input to said second input register means, said third transfer means for transferring the contents of said output register means into said second input register means.

15. The apparatus in accordance with claim 14 wherein said third transfer means is connected between the high order byte position of the output of said output register means and the low order byte position of the input to said second input register means.

16. The apparatus in accordance with claim 15 wherein said output register means includes means for shifting the contents of said output register means at least one bit position.

17. The apparatus in accordance with claim 1 further including
first byte transfer means, connected between one byte position of the output of said switchable means and one byte position of the incoming data input of said cryptographic device and responsive to said control means, said first byte transfer means for transferring the connected output of said switchable means to the connected incoming data input of said cryptographic device.

18. The apparatus in accordance with claim 17 wherein said first byte transfer means is connected between the high order byte position of the output of said switchable means and the low order byte position of the incoming data input to said cryptographic device.

19. The apparatus in accordance with claim 1 or 17 further including
second byte transfer means, connected between one byte position of the output of said memory means and one byte position of the key variable input to said cryptographic device and responsive to said control means, said second transfer means for transferring the connected output of said memory means to the connected key variable input of said cryptographic device.

20. The apparatus in accordance with claim 19 wherein said second byte transfer means is connected between the high order byte position of the output of said memory means and the low order byte position of the key variable input to said cryptographic device.

21. The apparatus in accordance with claim 1 or 2 wherein said generated working key variable supply means includes:
output register means for storing the translated data output of said cryptographic device; and
third transfer means, connected between the output of said output register means and the input to said key variable supply means, said third transfer means for transferring the contents of said output register means into said key variable supply means.

22. The apparatus in accordance with claim 21 wherein said third transfer means is characterized as being connected between the high order byte position of the output of said output register means and the low order byte position of the input of said key variable supply means.

23. The apparatus in accordance with claim 1 or 2 or 17 wherein said generated key variable supply means includes third transfer means, connected between the translated data output of said cryptographic device and the input to said key variable supply means, said third transfer means for transferring the translated data output of said cryptographic device into said key variable supply means.

24. The apparatus in accordance with claim 23 wherein said third transfer means is characterized as being connected between the high order byte position of the translated data output of said cryptographic device and the low order byte position of the input of said key variable supply means.

25. The method of generating a working key variable in accordance with claim 1 wherein said step d further includes the step of waiting until said cryptographic device has completed encrypting the contents of said incoming plain text data means before proceeding to said step e.

26. The method in accordance with claim 1 wherein the entire contents of said key variable input means is replaced by said generated working key variable in said step e.

27. A method of generating a working key variable for use in a cryptographic device, said cryptographic device including input means for accepting incoming plain text data, input means for accepting a key variable and an output for translated data, said method comprising the steps of:
a. providing said cryptographic device with an operator selected variable and a fixed value;
b1. transferring the high order byte of the provided operator selected variable into the low order byte position of said incoming plain text data means;
b2. shifting the contents of said incoming plain text data means one byte position left;
b3. shifting the provided operator selected variable one byte position left;
b4. repeating steps b1 through b3 until the entire provided operator selected variable has been transferred into the incoming plain text data means;
c. storing said fixed value in the key variable input means;
d. operating said cryptographic device wherein said operator selected variable stored in said incoming plain text data means is encrypted in accordance with said fixed value stored in said key variable input means, wherby a working key variable is generated at the translated data output of said cryptographic device; and
e. storing the generated working key variable in said key variable input means.

28. The method of generating a working key variable in accordance with claim 27 wherein said step c comprises the steps of:
j. transferring the high order byte of the provided fixed value into the low order byte position of the key variable input means;
k. shifting the content of said key variable input means one byte position left;
l. shifting the provided fixed value one byte position to the left; and
m. repeating steps j through l until the entire provided fixed value has been transferred into said key variable input means.

29. The method of generating a working key variable in accordance with claim 27 or 28 wherein said step e comprises the steps of:
n. transferring the high order byte of the translated output of said cryptographic device into the low order byte position of said key variable input means;
o. shifting the contents of said key variable input means one byte position left;
p. shifting the translated data output of said cryptographic device one byte position left; and
q. repeating steps n through p until the entire translated data output of said cryptographic device has been transferred into said key variable input means.

* * * * *

UNITED STATES PATENT AND TRADEMARK OFFICE
CERTIFICATE OF CORRECTION

PATENT NO. : 4,369,332
DATED : January 18, 1983
INVENTOR(S) : Carl M. Campbell, Jr.

It is certified that error appears in the above-identified patent and that said Letters Patent is hereby corrected as shown below:

Column 4, line 43, change the first occurrence of "the" to --this--.

Column 8, line 66, change "having" to --Having--.

In claim 25, at column 12, line 2, change "1" to --27--.

In claim 26, at column 12, line 7, change "1" to --27--

Signed and Sealed this

Twenty-second Day of March 1983

[SEAL]

Attest:

GERALD J. MOSSINGHOFF

Attesting Officer   Commissioner of Patents and Trademarks